(12) United States Patent
Kremerman

(10) Patent No.: US 10,549,212 B2
(45) Date of Patent: Feb. 4, 2020

(54) HORIZONTAL BOILING FLASK DISTILLATION SYSTEM

(71) Applicant: Elliot Kremerman, Los Gatos, CA (US)

(72) Inventor: Elliot Kremerman, Los Gatos, CA (US)

(*) Notice: Subject to any disclaimer, the term of this patent is extended or adjusted under 35 U.S.C. 154(b) by 0 days.

(21) Appl. No.: 16/458,466

(22) Filed: Jul. 1, 2019

(65) Prior Publication Data

US 2019/0321749 A1    Oct. 24, 2019

(51) Int. Cl.
| | | |
|---|---|---|
| *B01D 3/10* | (2006.01) | |
| *B01L 3/08* | (2006.01) | |
| *B01D 5/00* | (2006.01) | |
| *B01D 3/02* | (2006.01) | |
| *B01D 8/00* | (2006.01) | |
| *B01L 3/00* | (2006.01) | |

(52) U.S. Cl.
CPC ............. *B01D 5/006* (2013.01); *B01D 3/02* (2013.01); *B01D 3/10* (2013.01); *B01D 5/0006* (2013.01); *B01D 8/00* (2013.01); *B01L 3/563* (2013.01); *B01L 3/569* (2013.01); *B01D 5/0036* (2013.01); *B01D 5/0057* (2013.01); *B01D 5/0063* (2013.01); *B01L 3/08* (2013.01); *B01L 3/56* (2013.01)

(58) Field of Classification Search
CPC .... B01L 3/08; B01L 3/085; B01L 3/56; B01L 3/563; B01L 3/565; B01L 3/569; B01D 5/0036; B01D 5/0057; B01D 5/006; B01D 5/0063; B01D 3/10; B01D 3/12
See application file for complete search history.

(56) References Cited

U.S. PATENT DOCUMENTS

| | | | |
|---|---|---|---|
| 1,418,691 A | 6/1922 | Anders | |
| 2,383,377 A | 8/1945 | Evans | |
| 2,427,142 A | 9/1947 | Hornbacher | |
| 2,468,872 A | 5/1949 | Goldsbarry | |
| 2,701,789 A | 2/1955 | White | |
| 2,865,445 A * | 12/1958 | Buchler | B01D 3/085 159/23 |
| 3,240,682 A | 3/1966 | Gordon | |
| 3,334,025 A | 8/1967 | Reid | |
| 3,334,966 A | 8/1967 | Shepherd | |

(Continued)

OTHER PUBLICATIONS

YouTube video titled "Short Path Fractional Distillaiton Technology Updates Summit Research", Uploaded to YouTube channel "Elliot kremerman" on Feb. 6, 2018, Screen shot taken on Aug. 21, 2019, Available online at: https://www.youtube.com/watch?v=WD1NVu2bMuo (Year: 2018).*

*Primary Examiner* — Jonathan Luke Pilcher
(74) *Attorney, Agent, or Firm* — Michael J. Feigin, Esq.; Feigin and Fridman LLC

(57) ABSTRACT

A multi-pass distillation system has a boiling flask with a side exit portal which is functionally connected to a condenser, which is, in turn, functionally connected to one or more cold traps. The condenser condenses wet vapors into liquid while the cold traps protect a pump which is used to suction the air through the system from the boiling flask through the condenser and cold traps. In this manner, one can more accurately collect fractions by way of a sideways exit from the boiling flask, near the top of the flask, with a condenser extending into a body of the spherical flask, such as at a 45 degree angle.

17 Claims, 5 Drawing Sheets

(56) References Cited

U.S. PATENT DOCUMENTS

| | | | |
|---|---|---|---|
| 3,397,115 A | | 8/1968 | Tobey |
| 3,607,662 A | | 9/1971 | Glover |
| 3,736,234 A | | 5/1973 | Miyamoto |
| 3,812,010 A | | 5/1974 | Nitsch |
| 3,837,830 A | | 9/1974 | Eberhart |
| 4,081,331 A | | 3/1978 | Weiss |
| 5,076,349 A | | 12/1991 | Kadono |
| 5,164,049 A | | 11/1992 | Clark |
| 5,354,428 A | | 10/1994 | Clark |
| 5,398,806 A | * | 3/1995 | Quinn ..................... B01D 3/00 202/152 |
| 5,463,156 A | * | 10/1995 | Muroi .................... B01D 3/009 585/400 |
| 5,873,980 A | | 2/1999 | Young |
| 5,885,313 A | * | 3/1999 | Okamoto ............... B01D 3/085 55/315.2 |
| 5,961,787 A | | 10/1999 | Persson |
| 6,063,242 A | * | 5/2000 | Hauser .................. B01D 3/085 202/160 |
| 7,150,807 B2 | * | 12/2006 | Genser .................. B01D 3/085 159/6.1 |
| 9,682,331 B2 | | 6/2017 | Kremerman |
| 9,895,626 B2 | | 2/2018 | Kremerman |
| 9,895,627 B2 | | 2/2018 | Kremerman |
| 10,029,188 B2 | | 7/2018 | Kremerman |
| 10,279,281 B2 | | 5/2019 | Kremerman |
| 2003/0109729 A1 | * | 6/2003 | Diaz ....................... B01D 3/12 552/540 |
| 2009/0312567 A1 | * | 12/2009 | Hrnciar ................ B01J 19/0013 556/60 |
| 2015/0367250 A1 | | 12/2015 | Alstin |

\* cited by examiner

HORIZONTAL BOILING FLASK DISTILLATION SYSTEM

FIELD OF THE DISCLOSED TECHNOLOGY

The disclosed technology relates generally to distillation and, more specifically, to a boiling flask with horizontal exit pathway and distillation equipment used therewith.

BACKGROUND OF THE DISCLOSED TECHNOLOGY

Distillation or fractional distillation is carried out by heating a solid or liquid and removing gaseous vapors that are expelled therefrom. This can be done while raising the temperature, as each compound boils at a different temperature. However, when working with small amounts of starting raw material or items which have close boiling points, this can be difficult, as multiple compounds get removed simultaneously. Further, a problem can arise when the temperature throughout the distillation equipment is not constant, and some of the vapor re-condenses before being evacuated from a distillation chamber.

Thus, there is a need to find a way to distill with greater efficiency and separation of compounds, while preventing vapors from re-condensing back into the product being distilled.

SUMMARY OF THE DISCLOSED TECHNOLOGY

A multi-pass distillation system, which is multi-pass is that material to be distilled is handled multiple times in the same distillation process as well as can be re-entered into the system after being distilled, has a boiling flask with a side exit portal. A "side exit portal" is defined as "an opening which extends in a horizontal direction". A condenser is attached to the side exit portal and a plurality of cold traps are functionally attached to one another and/or the condenser. The side exit portal can be adjacent to a top side of the boiling flask. The boiling flask can have a heat source situated directly there-below, such as centered beneath a most bottom point on the sphere or substantially as such. The condenser can have a flange or hollow opening which extends into the boiling flask by way of the side exit portal, such that the condenser can extend into a spherical body of the boiling flask itself. The "spherical body" is defined as "a substantially spherical shaped device which is as such but for portals and associated connectors there-to which interrupt a spherical shape thereof." An end of the condenser which extends into the spherical body of the boiling flask is at a 45 degree angle (compared to an idealized flat ground or direction of pull of gravity) and can be situated directly above a heat source under the boiling flask.

For purposes of this disclosure, directions are given relative to gravity and the figures show the orientation of the devices as they are used in an embodiment of the disclosed technology. Thus "vertical" is in the Y direction on the figures (when the wording is right side up), "horizontal" is in the X direction and so forth. Further, it should be understood that geometric references are with respect to either or both of their strict geometric definitions and/or what an ordinary observer with consider such. For example, a true "sphere" is impossible to achieve but what appears to be an observer to be "spherical" is considered as such for purposes of this disclosure. Further, when an element is referred to as "above", "below", "to the left of", or "to the right of" another element this is with respect to one plane, e.g. "above" means higher in the Y axis but not necessarily situated in the same X axis and so forth unless otherwise specified.

In some embodiments, a most elongated length of the condenser is in a horizontal direction and in line with the exit portal of the boiling flask. Thus, vapors exiting from the boiling flask extend in a horizontal direction through the condenser for the most part (also referred to as, "substantially" in the claims). Of the plurality of cold traps, a first cold trap functionally connected to receive output of the condenser can be used, this first cold trap having coils extending in a vertical direction which are situated substantially above (such that 80% or more of the coils are above, in a Y plane, the condenser) coils in the condenser. The first cold trap can have an entry portal which extends into an exit portal of the condenser. The first cold trap, in embodiments of the disclosed technology, primarily causes condensation of wet vapors and blow by vapors. A "wet vapor" is defined as "a gas carrying liquid globules in suspension." A "blow by vapor" is defined as "vapors which, if uncooled, would stay suspended in gas while the gas through the system due to a force of a vacuum applied to the system."

The first cold trap has an exit portal connecting to a second cold trap of the plurality of cold traps in some embodiments. In such an embodiment the second cold trap of the plurality of cold traps has an exit portal extending into a third cold trap of the plurality of cold traps. The third cold trap then can have an exit portal which is above the second cold trap and the first cold trap through which a vacuum is pulled. When distilling a material (boiling the material causing vapors to be emitted at varied boiling points in order to separate the fractions, wherein fractions are vapors at particular boiling point ranges) the second cold trap has, on average, drier air pass through than the first cold strap and the third cold trap has, on average, drier air than the second cold trap in embodiments of the disclosed technology. "On average" is defined as "the median amount of vapor in the respective part of the distillation system during an entirety of distilling a particular piece of material."

Inside the boiling flask, in embodiments, is a material to be distilled; this material can be distilled a first time through the condenser and at least the first trap then collected, in part. The part which is collected can then be placed into the boiling flask a second time.

A vacuum sucks gas in a direction of the boiling flask towards the third cold trap in embodiments of the disclosed technology. The gas passes in a substantially horizontal direction (that is, moving, as a whole, from a left side to a right side though some turbulent flow can be found during this movement as long as a majority of the gas ultimately moves horizontally during the distillation) from the boiling flask through the condenser and into the first cold trap. The gas also can pass substantially in a vertical direction (see previous definition of "horizontal direction" except replace "left side to right side" with "upwards") through the first, second, and third cold traps.

The entire distillation unit can be used in the direction as shown on the paper or each part or the entirety thereof shown can be angled up to 30 degrees counterclockwise, such as 1, 2, 5, 10 or 15 degrees in embodiments of the disclosed technology in order that there be a slight upward direction of vapors through the otherwise "horizontal" pathways. This aids in flow of vapors through the system more efficiently.

A "distillation head" is defined as a device in which vapors of a solid, liquid, or combination solid and liquid product to be distilled move upwards therein before exiting into a distribution adapter or condenser. "Distillate" refers to and is defined as the vapor, liquid, or combination thereof which exits, by way of the fraction collector, from the distillation head and is ultimately fractionally distilled into component parts, each component part having different physical properties such as a different boiling point.

Any device or step to a method described in this disclosure can comprise, or consist of, that which it is a part of, or the parts which make up the device or step. The term "and/or" is inclusive of the items which it joins linguistically and each item by itself. Any element or described portion of the devices shown can be "substantially" as such, if used in the claims in this manner. Where used, "substantially" is defined as "within a 5% tolerance level thereof."

DETAILED DESCRIPTION OF EMBODIMENTS OF THE DISCLOSED TECHNOLOGY

A multi-pass distillation system has a boiling flask with a side exit portal which is functionally connected to a condenser, which is, in turn, functionally connected to one or more cold traps. The condenser condenses wet vapors into liquid while the cold traps protect a pump which is used to suction the air through the system from the boiling flask through the condenser and cold traps. In this manner, one can more accurately collect fractions by way of a sideways exit from the boiling flask, near the top of the flask, with a condenser extending into a body of the spherical flask, such as at a 45 degree angle.

Embodiments of the disclosed technology will become more clear in view of the following description of the figures.

Figure 1:
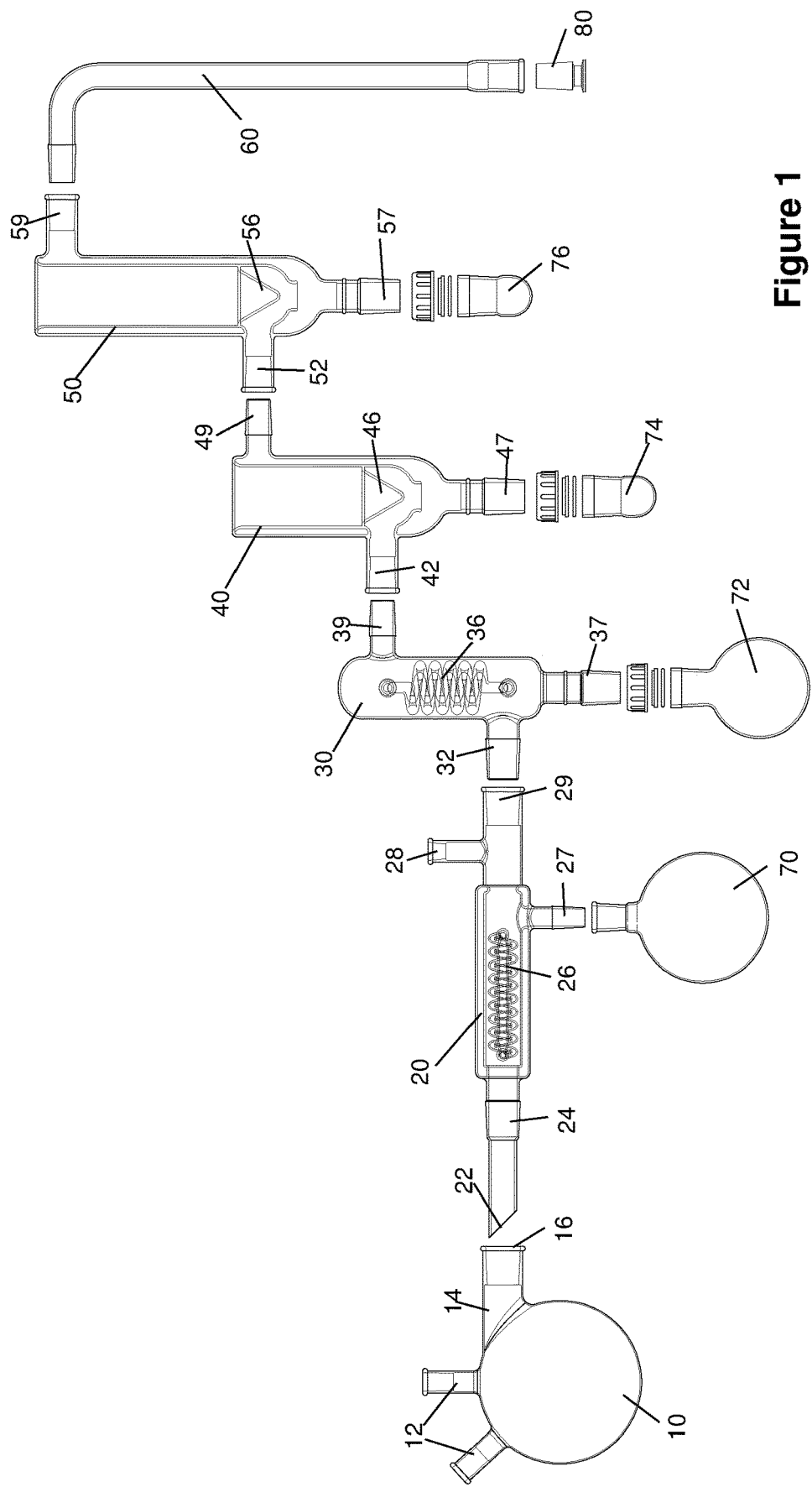
FIG. 1 shows a blown apart side view of a distillation system of embodiments of the disclosed technology.
Figure 2:
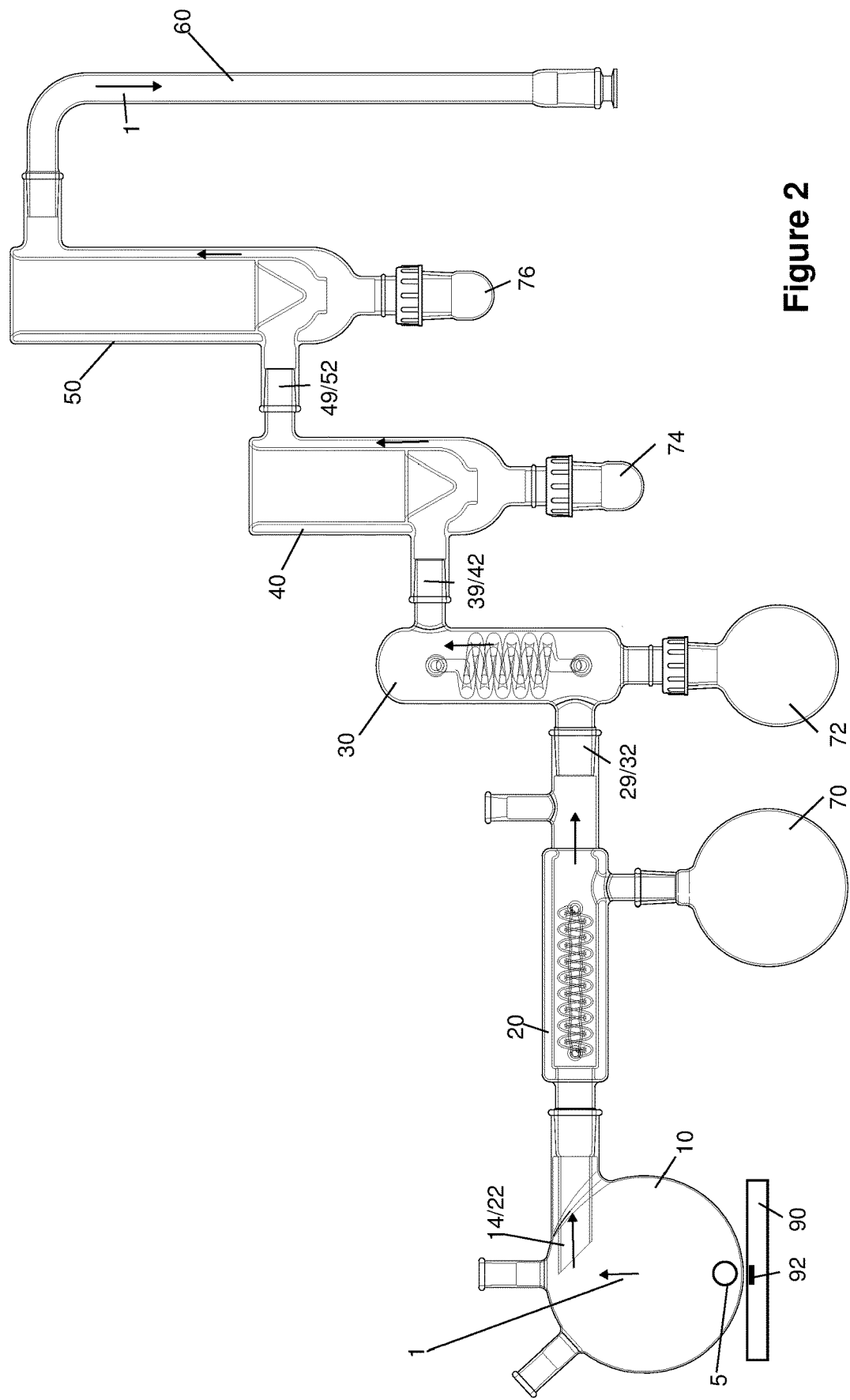
FIG. 2 shows a connected piece version of the distillation system of FIG. 1.
Figure 3:
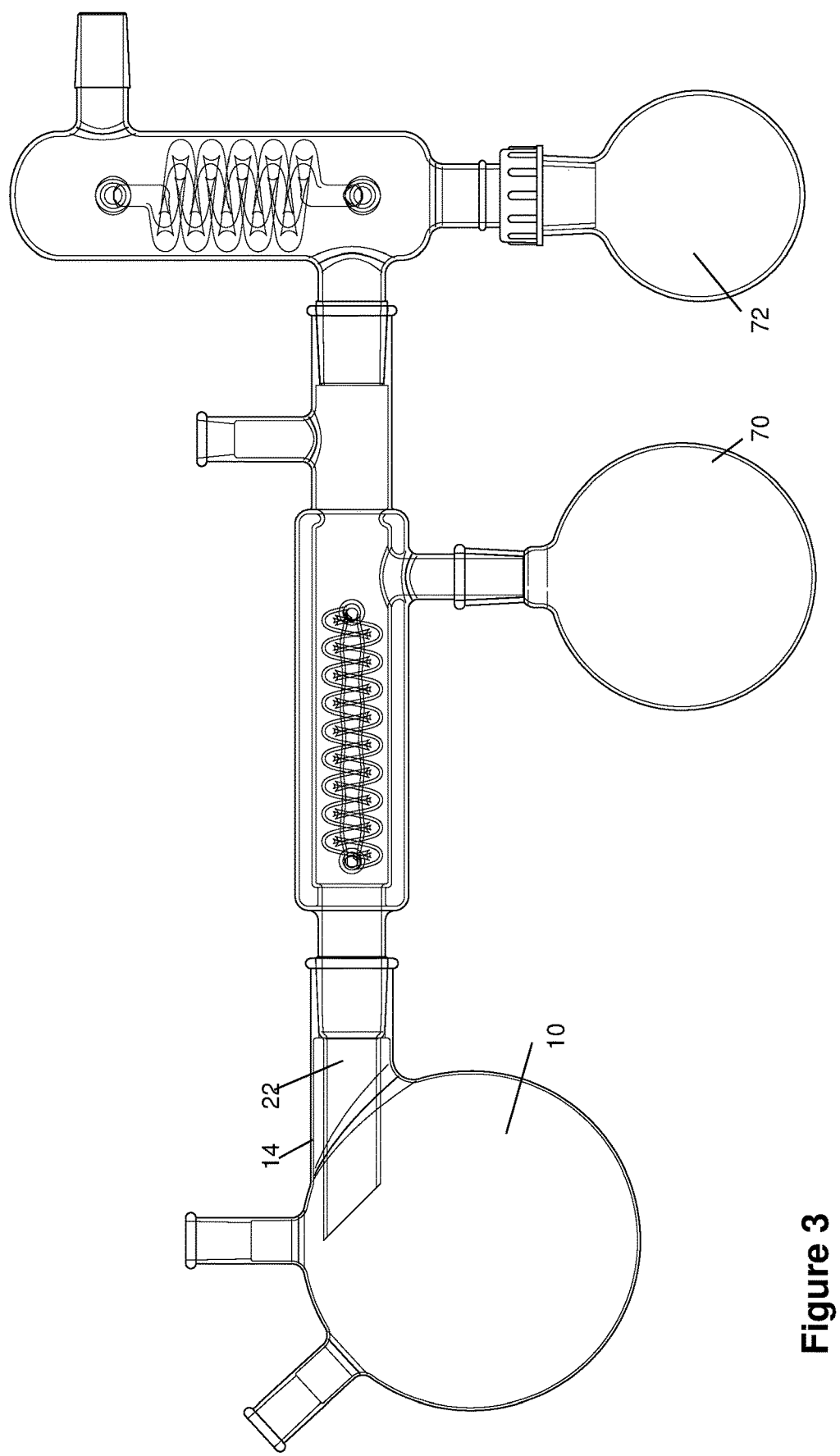
FIG. 3 shows a side exit flask, condenser, and first cold trap insert version of what is shown in FIG. 2.
Figure 4:
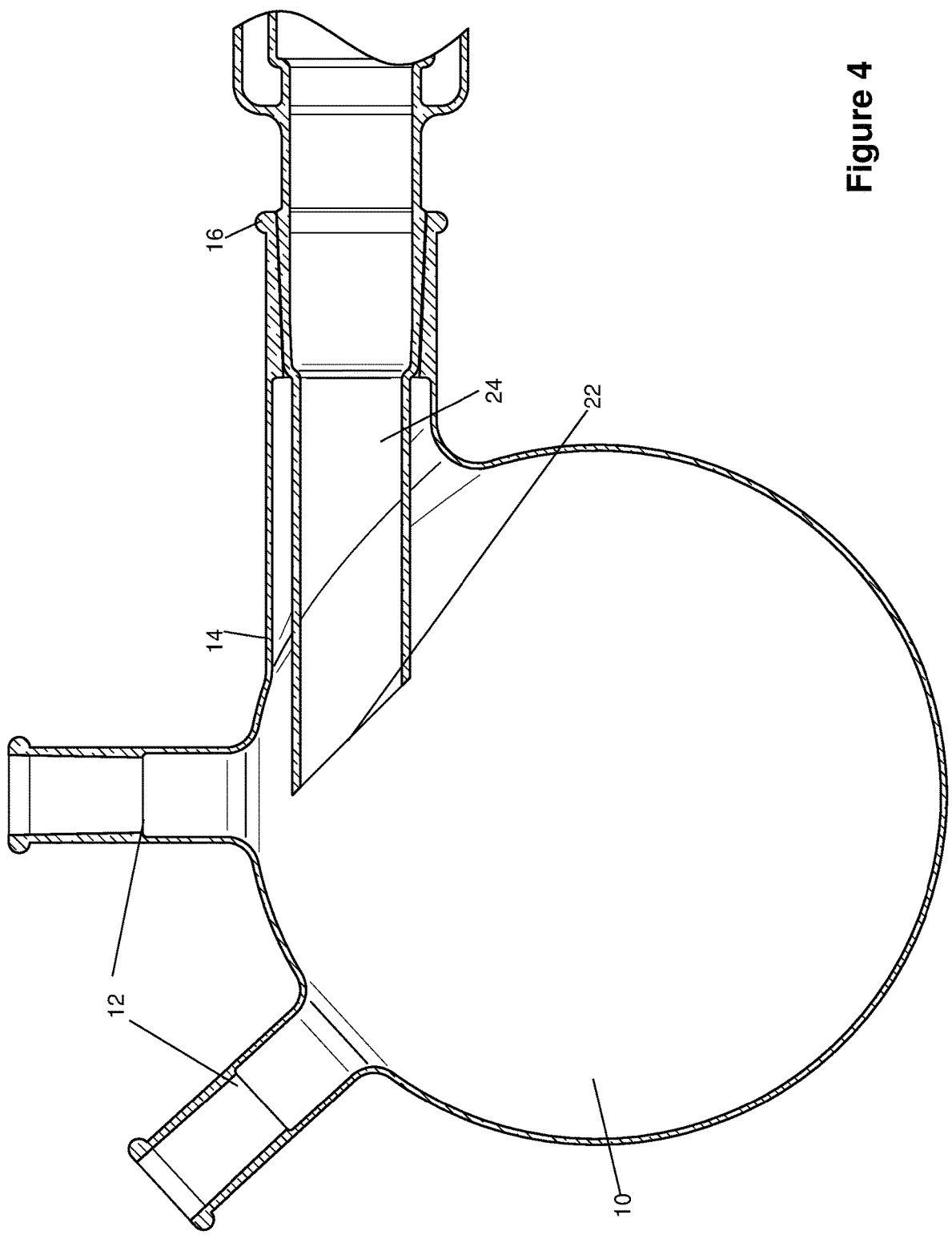
FIG. 4 shows a condenser entering into a side port of the side exit flask of the distillation system shown in FIG. 2.
Figure 5:
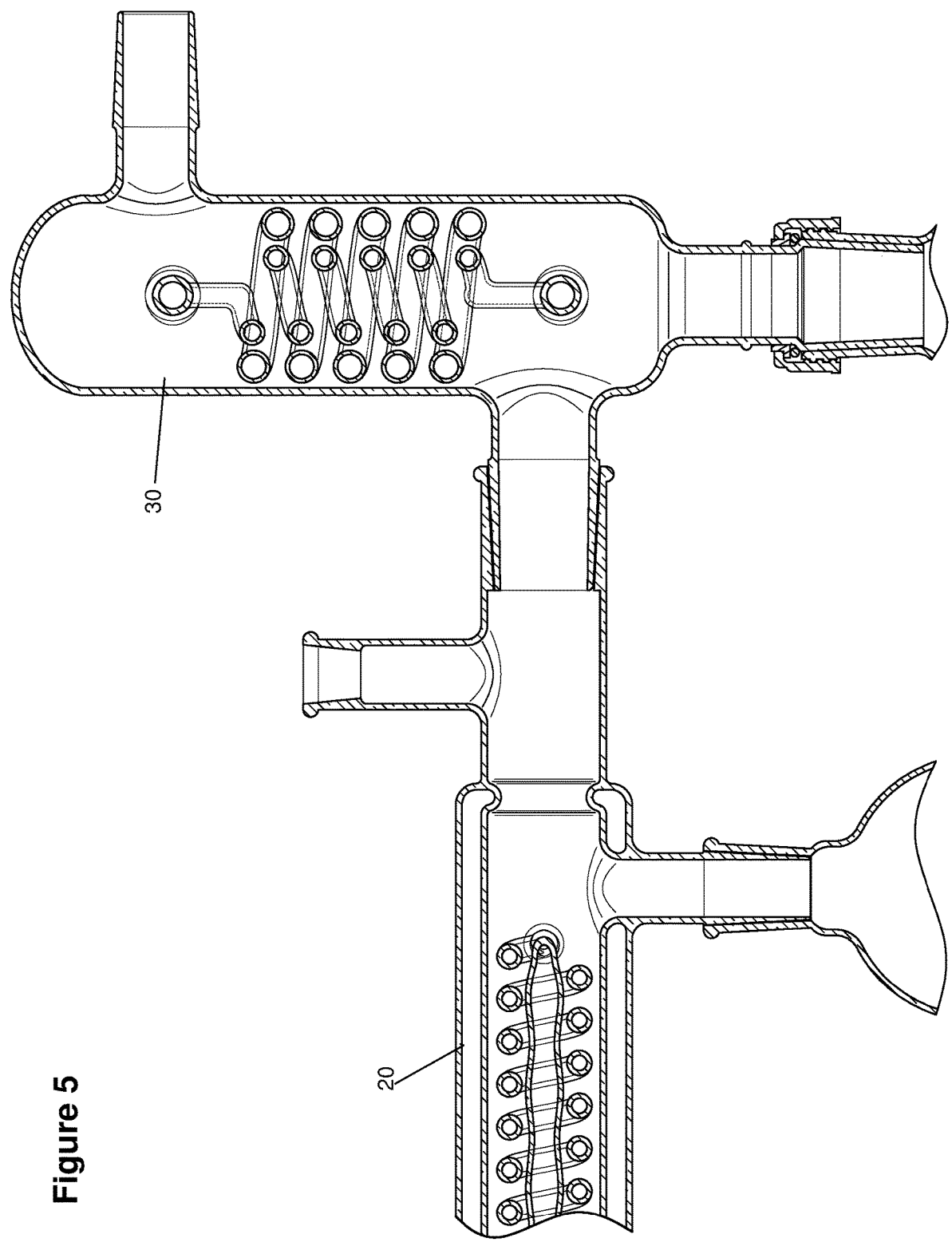
FIG. 5 shows a condenser and first cold trap insert version of what is shown in FIG. 2.

Discussing the figures simultaneously, FIG. 1 shows a blown apart side view of a distillation system of embodiments of the disclosed technology. FIG. 2 shows a connected piece version of the distillation system of FIG. 1. FIG. 3 shows a side exit flask, condenser, and first cold trap insert version of what is shown in FIG. 2. FIG. 4 shows a condenser entering into a side port of the side exit flask of the distillation system shown in FIG. 2. FIG. 5 shows a condenser and first cold trap insert version of what is shown in FIG. 2.

The boiling flask 10 or sideways exit flask has therewithin a material to be distilled 5, such as solid which is a mix of items each with different boiling points. It is situated above a heat source 90 or more pointed heat source 92, such as by being centered above the heat source. The heat source causes fractions to boil off the material 5 and enter into an internal area of the substantially spherical boiling flask 10. The arrows 1 show a direction where the substantial (majority) amount of gas flows, which is the general overall direction of same, ignoring turbulent flow and viewing the overall direction of the gas/vapors. Suction ports 12 can be used to create a vacuum, if desired.

The sideways portal or side exit portal 14 has a most elongated length which extends in a horizontal direction. Where "most elongated length" is used, this is a single vector direction line or line segment in a two dimensional plane and excludes, for example, a line which curls around an outside of an object which could technically be longer. The side exit portal 14 extends substantially from a top side of the spherical flask 10 (opposite a bottom side) where "substantially" in this case is "from within 10% of a distance from a top most point to a bottom most point of the flask 10" or "what an ordinary observer would consider from a top side and extending in a tangent thereto". The condenser 20 has an intake or opening 24 with an extreme end 22 which is functionally connected within and/or to the sideways portal 14. The extreme end 22 is a left or right (depending on setup) most edge of the condenser 20 with an opening there-in which, in embodiments of the disclosed technology, is at a 45 degree angle to the ground and/or bottom of the flask 10. That is, the opening is angled halfway between the ground and a horizontal direction. The end 22 or opening into the condenser opening 24 can further be situated directly above a heat source and/or directly above a center of a heat source 92 and/or centered horizontally within the flask 10.

The condenser 20 extends horizontally in it's most elongated direction and is, excluding for ports which extend upwards and downwards from a main body, aligned horizontally with the side exit portal 14 of the flask 10. A cooling tube 26 can be used to chill vapors which pass thereby causing wet vapors, blow by vapors, and other vapors to condense and fall through a bottom portal 27 into a collection flask 70. An upper portal 28 can be used for suction (create a vacuum) and an exit portal 29 is on an opposite side (e.g. right side) from that of the entrance portal 22/24. The exit portal 29 of the condenser 20 can fit over an entrance portal 32 of a first cold trap, the exit and entry portals, and for that matter, all exit and entry portals for vapors passing through the system on to another numbered element which incremented by 10 or more, being horizontal connections. Vertical flow of gas (outside of turbulent flow) is limited, in some embodiments, to being internally within the boiling flask 10 and one of the respective cold traps.

There can be a plurality of cold traps 30, 40, and 50 each connected in a horizontal manner to one another at respective female/male connection points 29/32, 39/42, and 49/52 of respective cold traps/condenses 20, 30, 40 and 50. That is, the first condenser 20 is connected to the first cold trap or condenser 30 which is, in turn connected to a second cold trap 40 which is connected to a third cold trap 50. A cold trap or condenser can be interchangeable though a device which extends primarily horizontally is a condenser only (a device having a tube with cold liquid flowing through but not touching the vapor) whereas where vapor extends primarily in the vertical, a cold trap or condenser should be read as being interchangeable in the claims. A "cold trap" is a device which has a cone-shaped bottom interior section around which vapors and/or gas flows. The vapors condense and fall downwards through a bottom portal 37, 47, or 57 while the non-condensed vapors and gas continue around the interior section with cold, travel upwards, and then exit from a side exit portal 39, 49, or 59. The condensed vapors are collected in various flasks 70 (connected to the condenser 20), flask 72 (connected to a first cold trap or condenser 30), flask 74 (connected to a second cold trap 40), or 76 (connected to a third cold trap 50).

After the gas has passed through each of the condensers or cold traps in the system, the gas exits into a vacuum tube 60 where it is pulled into a vacuum device 80. By the time the gas has entered into the vacuum device 80 it is substantially (in this case, defined as 90%+) dry or fully dry (within an acceptable tolerance known in the art). The additional cold traps protect from vapors entering into the vacuum device 80 removing any excess vapors from the gas, though in embodiments of the disclosed technology, a majority of the vapors condense at the first condenser 20 into the flask 70. When referring to the vapors or gas traveling in a direction, it should be understood that some gas/vapor exits at the points of connection or the upper portals 28, 12, and so forth but that what is being referenced is the majority of the flow of vapor.

The distillation system can be used in multiple passes allowing fractional distillation of a same material multiple times, by collecting fractions and running the fractions through the system, as described above, more than one time. Any or all of the devices shown can be or are made of glass which is translucent, in embodiments of the disclosed technology.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

I claim:

1. A multi-pass distillation system comprising:
    a boiling flask with a side exit portal with a most elongated length extending in a horizontal direction;
    a first condenser attached to said side exit portal;
    a plurality of cold traps and/or additional condensers functionally attached to one another and/or said first condenser;
    wherein said first condenser extends into said side exit portal of said boiling flask.

2. The multi-pass distillation system of claim 1, wherein said first condenser extends into a spherical body of said boiling flask.

3. The multi-pass distillation system of claim 2, wherein an end of said first condenser which extends into said spherical body of said boiling flask is at a 45 degree angle and is situated directly above a heat source under said boiling flask.

4. The multi-pass distillation system of claim 1, wherein a most elongated length of said first condenser is in a horizontal direction and in line with said exit portal of said boiling flask.

5. The multi-pass distillation system of claim 4, wherein said plurality of cold traps and/or additional condensers comprises at least a first cold trap functionally connected to receive output of said first condenser, said first cold trap comprising coils extending in a vertical direction situated substantially above coils in said first condenser.

6. The multi-pass distillation system of claim 5, wherein said first cold trap has an entry portal extending into an exit portal of said first condenser.

7. The multi-pass distillation system of claim 6, wherein said first cold trap causes condensation of wet vapors and blow by vapors.

8. The multi-pass distillation system of claim 5, wherein said first cold trap has an exit portal connecting to a second cold trap of said plurality of cold traps, and said second cold trap of said plurality of cold traps has an exit portal extending into a third cold trap of said plurality of cold traps.

9. The multi-pass distillation system of claim 8, wherein said third cold trap has an exit portal which is above said second cold trap and said first cold trap through which a vacuum is pulled.

10. The multi-pass distillation system of claim 9, wherein said second cold trap has, on average, drier air pass through than said first cold strap and said third cold trap has, on average, drier air than said second cold trap.

11. The multi-pass distillation system of claim 8, wherein a vacuum sucks gas from said boiling flask towards said third cold trap.

12. The multi-pass distillation system of claim 11, wherein said gas passes substantially in a vertical direction upwards through said first, second, and third cold traps.

13. The multi-pass distillation system of claim 12, wherein said gas passes substantially in a vertical direction through said first, second, and third cold traps.

14. The multi-pass distillation system of claim 1, wherein said side exit portal is adjacent to a top edge of said boiling flask.

15. The multi-pass distillation system of claim 14, wherein said condenser has an intake opening which opens at a horizontal center of said boiling flask.

16. The multi-pass distillation system of claim 1, wherein vapors move vertically through said boiling flask and at least one cold trap of said plurality of cold traps and/or additional condensers, and said vapors move horizontally through connectors between any of said boiling flask, first condenser, and cold traps.

17. A method of using the multi-pass distillation system of claim 1, comprising the steps of:
    distilling material through said first condenser;
    distilling said material through at least one trap of said plurality of traps;
    collecting said distilled material in part;
    placing said part collected into said boiling flask a second time.

* * * * *